US011574494B2

(12) United States Patent
Jaipuria et al.

(10) Patent No.: US 11,574,494 B2
(45) Date of Patent: Feb. 7, 2023

(54) TRAINING A NEURAL NETWORK TO DETERMINE PEDESTRIANS

(71) Applicant: Ford Global Technologies, LLC, Dearborn, MI (US)

(72) Inventors: Nikita Jaipuria, Union City, CA (US); Aniruddh Ravindran, Sunnyvale, CA (US); Hitha Revalla, Stanford, CA (US); Vijay Nagasamy, Fremong, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 16/773,339

(22) Filed: Jan. 27, 2020

(65) Prior Publication Data

US 2021/0232812 A1 Jul. 29, 2021

(51) Int. Cl.
*G06N 3/08* (2006.01)
*G06V 10/94* (2022.01)
(Continued)

(52) U.S. Cl.
CPC .......... *G06V 40/10* (2022.01); *G05D 1/0221* (2013.01); *G06F 3/013* (2013.01); *G06N 3/0454* (2013.01);
(Continued)

(58) Field of Classification Search
CPC ........ G06V 40/10; G06V 10/95; G06V 10/82; G06V 20/58; G06V 20/59; G06V 40/103;
(Continued)

(56) References Cited

U.S. PATENT DOCUMENTS 7,924,146 B2 4/2011 Seder et al.
2016/0173865 A1* 6/2016 Park ..................... G06V 40/171
348/118
(Continued)

FOREIGN PATENT DOCUMENTS

CN 103455795 B 12/2013
DE 102011084367 A1 4/2013

OTHER PUBLICATIONS

Fused Deep Neural Networks for Efficient Pedestrian Detection, Xianzhi Du, May 2, 2018.*
(Continued)

*Primary Examiner* — Marcos L Torres
(74) *Attorney, Agent, or Firm* — Frank A. MacKenzie; Bejin Bieneman PLC (57) ABSTRACT

A training system for a neural network system and method of training is disclosed. The method may comprise: receiving, from a sensor, an image frame captured while an operator is controlling a vehicle; using an eye-tracking system associated with the sensor, monitoring the eyes of the operator to determine eyeball gaze data; determining, from the image frame, a plurality of pedestrians; and iteratively training the neural network system to determine, from among the plurality of pedestrians, the one or more target pedestrians using the eyeball gaze data and an answer dataset that is based on the eyeball gaze data, wherein the determined one or more target pedestrians have a relatively-higher probability of collision with the vehicle than a remainder of the plurality of pedestrians.

17 Claims, 5 Drawing Sheets

(51) Int. Cl.
*G06V 40/10* (2022.01)
*G05D 1/02* (2020.01)
*G06N 3/04* (2006.01)
*G06F 3/01* (2006.01)

(52) U.S. Cl.
CPC .............. *G06N 3/08* (2013.01); *G06V 10/95* (2022.01); *G05D 2201/0213* (2013.01)

(58) Field of Classification Search
CPC ...... G06V 40/18; G06V 40/20; G05D 1/0221; G05D 2201/0213; G06F 3/013; G06N 3/0454; G06N 3/08; G06N 3/04; G06K 9/6271; G06K 9/6268
See application file for complete search history.

(56) References Cited

U.S. PATENT DOCUMENTS

| | | | |
|---|---|---|---|
| 2017/0031363 A1* | 2/2017 | Laur | ...................... G05D 1/024 |
| 2018/0096457 A1 | 4/2018 | Savvides et al. | |
| 2018/0137642 A1 | 5/2018 | Malisiewicz et al. | |
| 2018/0225554 A1 | 8/2018 | Tawari et al. | |
| 2019/0246036 A1* | 8/2019 | Wu | ......................... G06F 21/31 |
| 2019/0265712 A1 | 8/2019 | Satzoda et al. | |
| 2019/0346844 A1 | 11/2019 | Chen et al. | |
| 2019/0374151 A1 | 12/2019 | Paudel et al. | |
| 2020/0125093 A1* | 4/2020 | Sham | ..................... B60W 30/08 |
| 2020/0364453 A1* | 11/2020 | Tonsen | ................... G06V 40/18 |
| 2021/0056306 A1* | 2/2021 | Hu | ......................... G06V 20/59 |
| 2021/0088784 A1 | 3/2021 | Whitmire et al. | |
| 2021/0232812 A1 | 7/2021 | Jaipuria et al. | |
| 2022/0083134 A1 | 3/2022 | Kassner et al. | |

OTHER PUBLICATIONS

Palazzi, A., et al., "Predicting the Driver's Focus of Attention: the DR(eye)VE Project," University of Modena, Department of Engineering, Jun. 6, 2018, 25 pages.
Non-Final Office Action as issued by the USPTO dated Sep. 1, 2021 for related matter U.S. Appl. No. 16/867,690, filed May 6, 2020.
Final Office Action as issued by the USPTO dated Jan. 10, 2022 for related matter U.S. Appl. No. 16/867,690, filed May 6, 2020.
Non-Final Office Action as issued by the USPTO dated May 2, 2022 for related matter U.S. Appl. No. 16/867,690, filed May 6, 2020.

* cited by examiner

*FIG. 6*   Convolutional layer 90   Pooling layer 92   Flattening 94

TRAINING A NEURAL NETWORK TO DETERMINE PEDESTRIANS

BACKGROUND

Autonomous vehicles can execute computer-controlled steering and speed-control based on sensor input. In some instances, the computer may predict a directional vector of a pedestrian (i.e., the pedestrian's speed and direction). When a large quantity of pedestrians are present in the vehicle's environment, this can be computationally burdensome.

DETAILED DESCRIPTION

A method of training a neural network system to determine one or more target pedestrians may comprise: receiving, from a sensor, an image frame captured while an operator is controlling a vehicle; using an eye-tracking system associated with the sensor, monitoring the eyes of the operator to determine eyeball gaze data; determining, from the image frame, a plurality of pedestrians; and iteratively training the neural network system to determine, from among the plurality of pedestrians, the one or more target pedestrians using the eyeball gaze data and an answer dataset that is based on the eyeball gaze data, wherein the determined one or more target pedestrians have a relatively-higher probability of collision with the vehicle than a remainder of the plurality of pedestrians.

According to the method example set forth above and/or according to any of the other examples set forth above, the eye-tracking system is a wearable eye-tracking system and is worn by the operator while the image frame is captured by the sensor.

According to the method example set forth above and/or according to any of the other examples set forth above, the neural network system comprises a convolutional neural network (CNN) and a fully connected neural network, wherein an input to the CNN is the image frame, wherein an output of the CNN is provided to the fully connected neural network, wherein an output of the fully connected neural network is an indication of the one or more target pedestrians.

According to the method example set forth above and/or according to any of the other examples set forth above, the neural network system comprises a pedestrian detection algorithm and a first deep neural network (first DNN), wherein an input to the pedestrian detection algorithm is the image frame, wherein an output of the first DNN is an indication of the one or more target pedestrians.

According to the method example set forth above and/or according to any of the other examples set forth above, the neural network system further comprises a second deep neural network (second DNN) and a third deep neural network (third DNN), wherein an input to the second DNN is the image frame, wherein an output of the second DNN and an output of the first DNN are inputs to the third DNN, wherein an output of the third DNN is an indication of the one or more target pedestrians.

According to the method example set forth above and/or according to any of the other examples set forth above, iteratively training the neural network system further comprises providing eyeball gaze data to one or more of the first, second, and third DNNs.

According to the method example set forth above and/or according to any of the other examples set forth above, the first and third DNNs are each fully connected neural networks, wherein the second DNN is a convolutional neural network.

According to the method example set forth above and/or according to any of the other examples set forth above, the first DNN has a different quantity of hidden layers, a different quantity of neurons, or both than the second DNN.

According to the method example set forth above and/or according to any of the other examples set forth above, iteratively training the neural network system includes evaluating subsequent image frames with each of the pedestrian detection algorithm, the first DNN, the second DNN, and the third DNN.

According to the method example set forth above and/or according to any of the other examples set forth above, the pedestrian detection algorithm is a single shot multibox detector algorithm.

According to the method example set forth above and/or according to any of the other examples set forth above, the method further comprises: repeating the receiving, monitoring, and determining steps; and for each respective image frame, determining the answer dataset based on the eyeball gaze data.

According to the method example set forth above and/or according to any of the other examples set forth above, the method further comprises: calculating a difference using a loss function, wherein the difference is based on the answer dataset and an output of the neural networks system, wherein iteratively training the neural network system is repeated until the difference is less than a threshold.

According to the method example set forth above and/or according to any of the other examples set forth above, the method further comprises: when the difference is not less than the threshold, adjusting a plurality of weights associated with the neurons of neural network system.

According to the method example set forth above and/or according to any of the other examples set forth above, the iteratively training comprises supervised learning.

According to the method example set forth above and/or according to any of the other examples set forth above, the image frame is one of a plurality of video frames received from the sensor.

According to the method example set forth above and/or according to any of the other examples set forth above, the eye-tracking system comprises the sensor, one or more illuminators directed toward the operator's eyes, one or more cameras directed toward the operator's eyes, and a computer programmed to use the eyeball gaze data and the image frame to determine a gaze point of the operator, wherein the sensor comprises a red-green-blue (RGB) camera.

According to the method example set forth above and/or according to any of the other examples set forth above, the method further comprises: installing the trained neural network system in a vehicle; and using the trained neural network system to navigate the vehicle in an autonomous mode.

According to the method example set forth above and/or according to any of the other examples set forth above, the eyeball gaze data comprises one or more of the following information: a timestamp (of the image frame), a left eye gaze point, a right eye gaze point, a left eye three-dimensional (3D) gaze position, a right eye 3D gaze position, a combined-eye 3D gaze position, a left eye pupil position, a right eye pupil position, a left eye pupil diameter, a right eye pupil diameter, a left eye confidence parameter, a right eye confidence parameter, a galvanic skin response parameter, a tri-axis accelerometer value, a tri-axis gyroscopic value, or a mapped gaze point.

According to at least one additional illustrative example, a training system is described that comprises: a sensor; an eye-tracking system; a test computer communicatively coupled to the sensor and eye-tracking system, comprising one or more processors and memory storing instructions executable by the one or more processors, the instructions comprising to: receive, from the sensor, an image frame captured while an operator is controlling a vehicle; using the eye-tracking system, monitor the eyes of the operator to determine eyeball gaze data; determine, from the image frame, a plurality of pedestrians; and iteratively train a neural network system to determine, from among the plurality of pedestrians, the one or more target pedestrians using the eyeball gaze data and an answer dataset that is based on the eyeball gaze data, wherein the determined one or more target pedestrians have a relatively-higher probability of collision with the vehicle than a remainder of the plurality of pedestrians.

According to the at least one example set forth above, the neural network system comprises a pedestrian detection algorithm, a first deep neural network (first DNN), a second deep neural network (second DNN), and a third deep neural network (third DNN), wherein an input to each of the pedestrian detection algorithm and the second DNN is the image frame, wherein an output of the first and second DNNs are inputs to the third DNN, wherein an output of the third DNN is an indication of the one or more target pedestrians.

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Turning now to the figures, wherein like reference numerals indicate like or similar features and/or functions, a training system 10 that includes a neural network system and technique for using the training system 10 is disclosed. Once trained, the neural network system may be installed into a vehicle 12 enabling the vehicle 12 to navigate in an autonomous mode. More particularly, the neural network system may be trained to identify pedestrians which have a higher likelihood of collision with an object in their immediate environment (such as vehicle 12)—e.g., as a result of a speed and/or trajectory of the vehicle 12 and/or a speed and/or trajectory of the respective pedestrian. As used herein, a pedestrian is defined as a human person that is afoot.

Neural networks may be trained by a programmer hand picking (e.g., hand selecting) certain features to teach the neural network to behave in a desired way. However, as discussed herein, training the neural network system of system 10 (via supervised learning) is improved by using data derived from an experienced human driver/operator H instead. Training the neural network system includes using an eye-tracking system 14 that determines the operator's eyeball gaze data while the operator H controls vehicle 12. More particularly, the output of the eye-tracking system 14 includes the operator's eyeball movements and position correlated to a number of features in a captured image; and some of these features, when appropriate, will include pedestrians within the operator's field of view. Thus, when training the neural network system, the eyeball gaze data is presumed to be a better identification of relevant features than a programmer hand picking features—as what the operator H views or what catches the operator's attention during operator-driving tends to have greater influence on operator behavior and operator decision-making. In addition, using this training technique improves the computational efficiency in training the neural network system.

Once trained, the neural network system may be installed on numerous vehicle computers and can be used to navigate the respective vehicles to avoid collision scenarios with pedestrians. Further, once installed to an onboard computer, the trained neural network system increases the computational efficiency regarding navigation. For example, operating in an autonomous mode typically requires pedestrian tracking—i.e., predicting the trajectories of all pedestrians in a scene. However, this can be computationally intensive. Utilizing the trained neural network system described herein, a subset of pedestrians (referred to herein as target pedestrians) which have a relatively higher likelihood of collision with vehicle 12 may be selected—and trajectories for only that subset of pedestrians may be determined. Thus, using the trained neural network system streamlines the efficiency of such onboard calculations.

Figure 1:
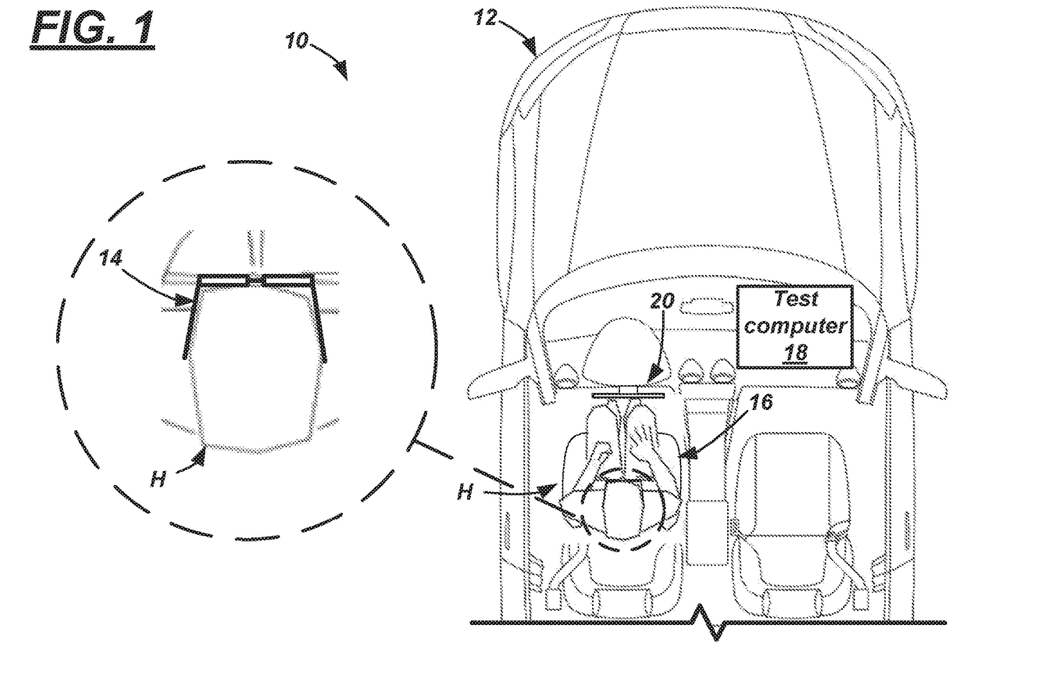
FIG. 1 is a schematic diagram of a training system for a neural network system that includes a vehicle (only a portion of which is shown), an example eye-tracking system, and a test computer.
Figure 2:
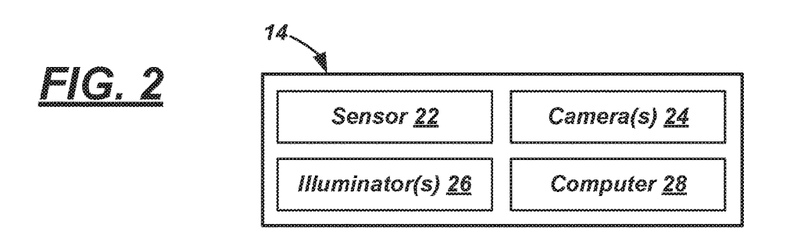
FIG. 2 is an exemplary schematic diagram of the eye-tracking system.
Figure 3:
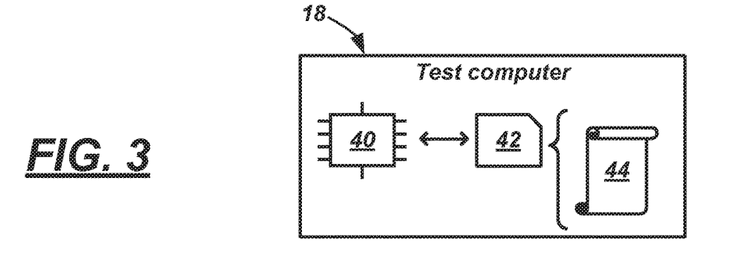
FIG. 3 is an exemplary schematic diagram of the test computer.

FIGS. 1-3 illustrate the training system 10 which may comprise vehicle 12, eye-tracking system 14 (e.g., which may be worn by human operator H in a driver's seat 16 of vehicle 12), and a test computer 18 which utilizes a neural network system (NNS). Each will be discussed in turn.

In FIG. 1, the illustrated vehicle 12 is a passenger vehicle; however, this is merely one example. Vehicle 12 instead could be a truck, a sports utility vehicle (SUV), a recreational vehicle, a bus, a marine vehicle, an aircraft, or any other suitable vehicle that comprises a driver control interface 20 (e.g., such as a steering wheel, accelerator control, braking control, etc.). Vehicle 12 may be configured to operate in any suitable partially autonomous or fully autonomous mode (e.g., including navigation without human interaction).

As shown in FIGS. 1-2, eye-tracking system 14 may comprise any apparatus which monitors eyeball gaze data of the operator H and repeatedly determines a gaze point (e.g., where the operator H is looking) that corresponds with a captured image. In some examples, the eye-tracking system 14 comprises a forward-looking sensor 22 (e.g., such as a red-green-blue (RGB) camera) that concurrently captures video representative of the operator's field of view (FOV), multiple eye-monitoring cameras 24, multiple illuminators 26 directed toward the operator's eyes, and a computer 28 configured to determine repeatedly eyeball gaze data of the operator H for a plurality of image frames of video data from the sensor 22. The eye-tracking system 14 may be a so-called wearable eye-tracking system or it may be a system mounted in the vehicle 12. A non-limiting commercial implementation of the eye-tracking system 14 is the "Pro Glasses 2" by Tobii AB which comprise an eyeglasses frame, lenses, and the hardware discussed above. In other examples, the sensor 22 and/or computer 28 may not be part of a common assembly with the camera(s) 24 and illuminator(s) 26—e.g., the sensor 22 could be mounted elsewhere in the vehicle 12 or the like.

Non-limiting examples of eyeball gaze data include sets of information for each frame(i) of video; e.g., wherein i is an integer value (e.g., i=0 to N), wherein N is the total quantity of frames of video. Each set of information may comprise one or more of the following illustrative eyeball gaze data criteria: a timestamp (of the frame), a left eye gaze point (e.g., an (x, y) value within the frame(i), a right eye gaze point (e.g., an (x, y) value within the frame(i), a left eye three-dimensional (3D) gaze position (e.g., an (x, y, z) value with respect to the field of view of the operator H, a right eye 3D gaze position (e.g., an (x, y, z) value with respect to the field of view of the operator H, a combined-eye 3D gaze position (e.g., both left and right eyes), a left eye pupil position, a right eye pupil position, a left eye pupil diameter, a right eye pupil diameter, a left eye confidence parameter (e.g., indicating an accuracy probability relative to the aforementioned criteria), a right eye confidence parameter (e.g., indicating an accuracy probability relative to the aforementioned criteria), a galvanic skin response (GSR) parameter, a tri-axis accelerometer value (e.g., indicating translational forces according to a three-space frame of reference), a tri-axis gyroscopic value (e.g., indicating pitch, roll, and yaw forces according to the same frame of reference), and a mapped gaze point (namely, a correlation of the right and left gaze point values and the right, left, and combined-eye 3D gaze positions with the frame(i)). Additional examples of criteria may be combined in part with the above example criteria or wholly combined. Thus, it should be appreciated that the camera(s) 24 and illuminator(s) 26 may be directed toward the operator's right and left eyes, and computer 28 uses this information (along with sensor data from sensor 22) to calculate the above criteria.

Test computer 18 (FIGS. 1, 3) may comprise one or more processors 40 (only one is shown in the diagram for purposes of illustration), memory 42, and a plurality of instructions 44 (by way of example only, software code) which is stored on memory 42 and which is executable by processor(s) 40. Processor(s) 40 may be programmed to process and/or execute digital instructions to carry out at least some of the tasks described herein. Non-limiting examples of processor(s) 40 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 40 read from memory 42 and execute multiple sets of instructions (e.g., including instructions 44) which may be embodied as a computer program product stored on a non-transitory computer-readable storage medium (e.g., such as memory 42). Non-limiting examples of instructions 44 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 42 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 42 may store one or more sets of instructions (e.g., such as instructions 44) which may be embodied as software, firmware, or other programming instructions executable by the processor(s) 40—including but not limited to the instruction examples set forth herein. In operation, processor(s) 40 may read data from and/or write data to memory 42.

Figure 4:
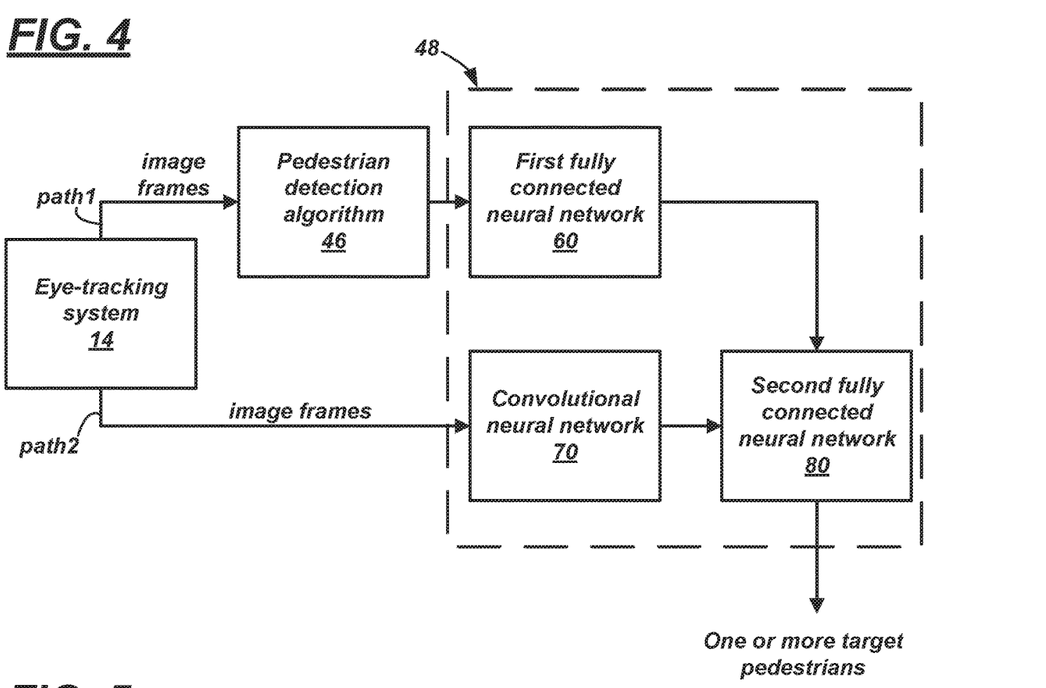
FIG. 4 is a schematic diagram illustrating an example of a neural network system.

The instructions 44 (stored in memory 42 and executable by processor(s) 40) may comprise any suitable set of instructions for carrying out the methods described herein. As described more fully below, the instructions 44 may include a pedestrian detection algorithm 46 and a neural network system (NNS) 48 (see FIG. 4) that comprises at least one deep neural network (DNN) which identifies—from image data—pedestrians that are most likely to collide with an object (such as vehicle 12). FIG. 4 illustrates a non-limiting example of software architecture, wherein the neural network system 48 comprises a first deep neural network (first DNN) 60 (embodied here as a first fully connected neural network), a second deep neural network (second DNN) 70 (embodied here as a convolutional neural network (CNN)), and a third deep neural network (third DNN) 80 (embodied here as a second fully connected neural network). As shown, image frames(i) may be provided at least partially concurrently to both the pedestrian detection algorithm 46 (along a first computational path (path1)) and to the second DNN 70 (along a second computational path (path2)). The output of the pedestrian detection algorithm 46 may be fed into the first DNN 60 (continuing on path1), and the outputs of both the first and second DNNs 60, 70 may be fed into the third DNN 80, wherein an output of third DNN 80 may be one or more target pedestrians. This process is intended to be executed repeatedly. Each of the algorithm 46 and the first, second, and third DNNs 60-80 are described in more detail below.

Pedestrian detection algorithm 46 may comprise any software algorithm which identifies, classifies, labels, etc. one or more pedestrians within an image frame(i). Desirably, most or all pedestrians are identified, classified, and/or labeled using the algorithm 46; however, this is not required in all examples. In some examples, the pedestrian detection algorithm 50 identifies pedestrians by overlaying a bounding box around the pedestrian; however, other techniques may be employed instead or in addition to bounding boxes (note: bounding boxes (B) are illustrated by way of example in FIG. 7). One non-limiting implementation of the pedestrian detection algorithm 46 is the single shot multibox detector algorithm described in "SSD: Single Shot MultiBox Detector" by Wei Liu, Dragomir Anguelov, Dumitru Erhan, Christian Szegedy, Scott Reed, Cheng-Yang Fu, and Alexander C. Berg, published 29 Dec. 2016, the entirety of which is incorporated herein by reference. Of course, this is merely one example; and other pedestrian detection algorithms can be used instead. Accordingly, it should be appreciated that an input to the pedestrian detection algorithm 46 is one or more image frames(i) and an output of the algorithm 46 includes at least a determination of some of at least some the pedestrians in the respective image frames(i)—i.e., of course, when pedestrians are present.

Figure 5:
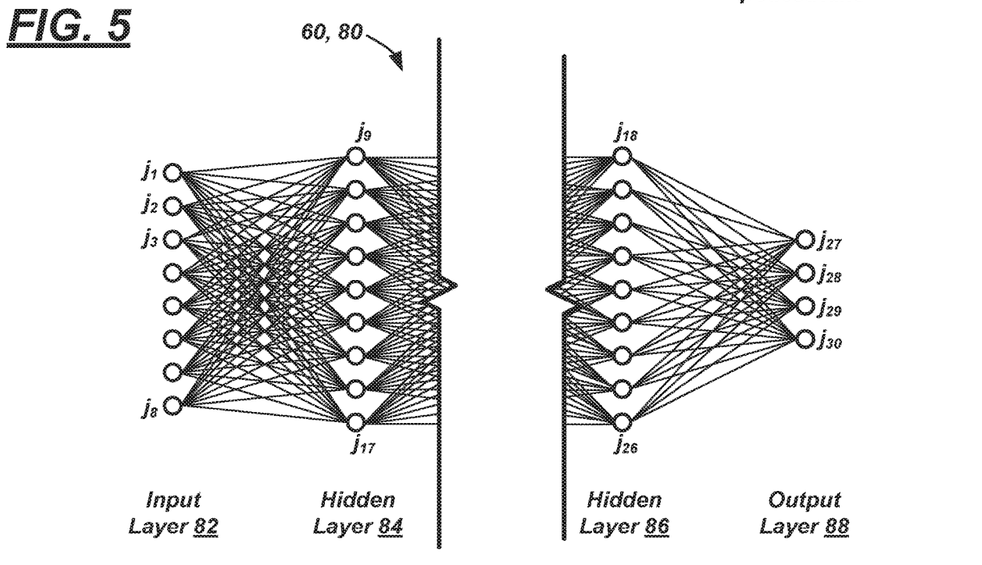
FIG. 5 is a schematic diagram illustrating an example of a deep neural network (DNN) of the neural network system, more particularly, a fully connected neural network.

Returning to FIG. 4, one example of the first deep neural network (first DNN) 60 will be described; however, it should be appreciated that other implementations are possible. As previously stated, first DNN 60 may be a fully connected neural network as shown in FIG. 5. Thus, first DNN 60 may comprise an input layer 82, one or more hidden layers 84, 86 (two are shown by way of example, however, any suitable quantity of layers may be used), and an output layer 88, wherein each layer comprises a plurality of neurons(j) (also referred to as 'nodes;' each neuron having a unique index j. In a fully connected neural network, each neuron of a given layer is connected to each of the neurons in a subsequent layer (as shown). Thirty neurons are shown in FIG. 5; however, this is merely an example quantity; the layers 82-88 respectively may have any suitable quantities of neurons.

Sets of inputs to the input layer 82 may comprise the output of the pedestrian detection algorithm 46. With regard to other layers (e.g., layers 84-88), sets of inputs to each neuron can be represented by the connections from a previous layer. For example, in the diagram, each of neurons $j_1$-$j_8$ (of layer 82) provide an input to $j_9$ (of layer 84), and each of these inputs may be multiplied by a respective weight. In some examples, the weighted inputs may be summed according to an input function to yield a net input (which may or may not be adjusted according to a respective bias value). In some examples, the respective net input may be provided to a predetermined neural network function (e.g., such as an activation function or the like) which in turn provides an output. This of course is repeated similarly for each neuron of the respective layer. As illustrated, the output of a respective neuron may be an input to a plurality of neurons in a subsequent layer or comprise the output layer 88.

The fully connected neural network shown in FIG. 5 also may illustrate the third DNN 80. However, it should be appreciated that it is not required that first and third DNNs 60, 80 be identical. For example, third DNN 80 may have any suitable quantity of neurons, hidden layers, neurons in its input layer, neurons in its output layer, etc.

Figure 6:
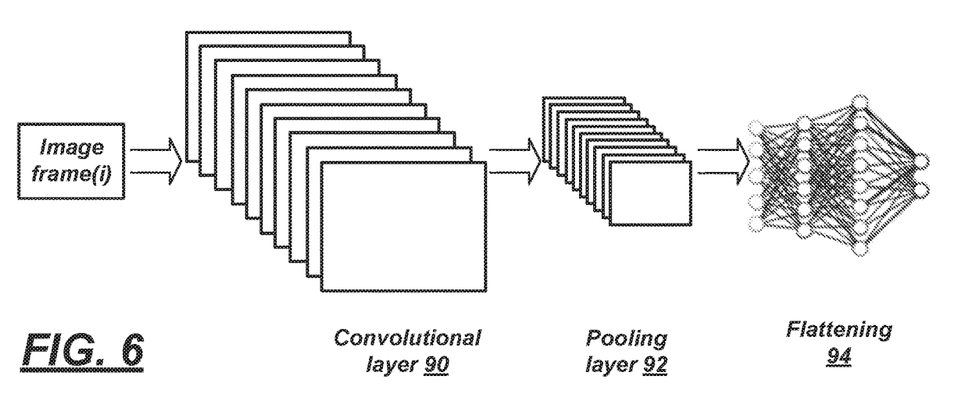
FIG. 6 is a schematic diagram illustrating another example of a deep neural network (DNN) of the neural network system, more particularly, a convolutional neural network (CNN).

Turning now to the second DNN 70 shown in FIG. 6, second DNN 70 may be a convolutional neural network (CNN) adapted to classify pedestrians in each image frame (i). According to one non-limiting example, second DNN 70 may comprise a convolutional layer 90, a pooling layer 92, and flattening 94. The convolutional layer 90 may receive the image frame(i) and convolve the image frame(i) using a kernel or filter—e.g., yielding a plurality of convolved features. Thereafter, the pooling layers 92 may reduce the spatial size of the convolved feature. Typically (although not required), there may exist multiple iterations of convolution followed by pooling. Thereafter, flattening 94 may convert the pooling output to a suitable column vector for input to a neural network, wherein classification occurs (e.g., using at least one predetermined neural network function, e.g., such as SoftMax). Other aspects and convolution techniques may be employed as well.

Figure 7:
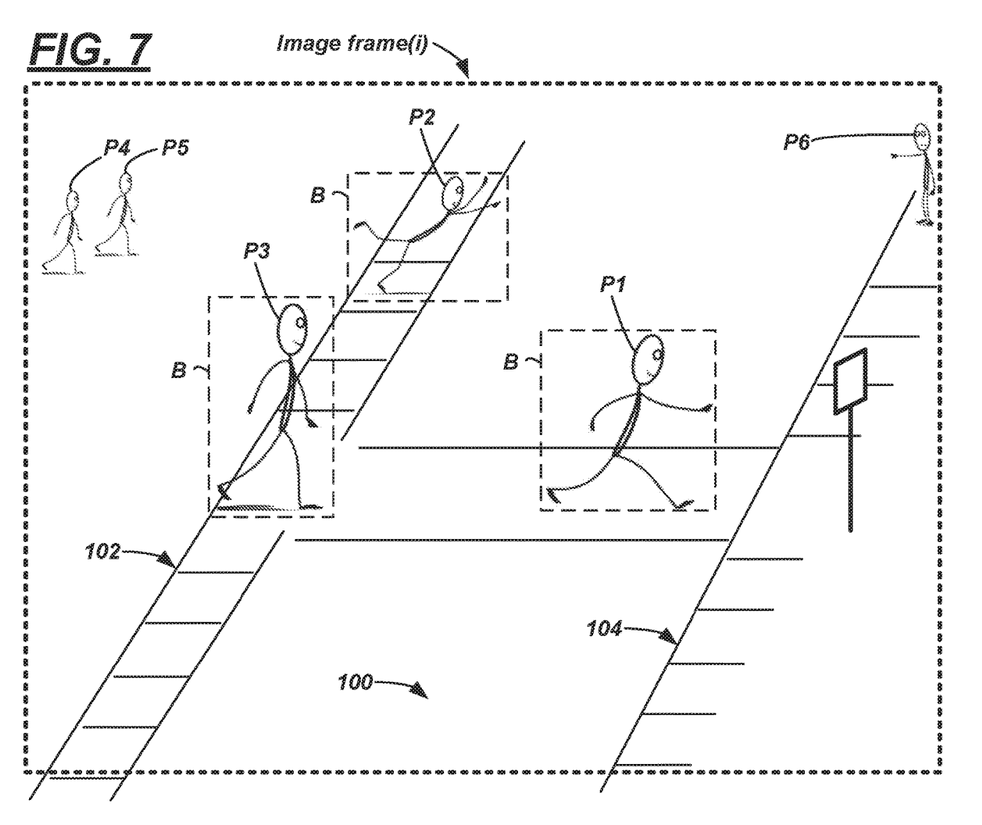
FIG. 7 is a schematic diagram illustrating an example of an image frame that includes a plurality of pedestrians.

Turning to FIG. 7, an example of an image frame(i) captured by sensor 22 is shown; As will be apparent from the description below, FIG. 7 will be used to illustrate the processes shown in FIGS. 8-9. FIG. 7 illustrates a roadway 100, a sidewalk 102 on one side of roadway 100, a sidewalk 104 on an opposite side of roadway 100, and a plurality of pedestrians P1, P2, P3, P4, P5, P6 all of which are within a field of view of sensor 22. In the example image frame(i), pedestrian P1 is walking within (and across) roadway 100, pedestrian P2 is falling (e.g., tripping) into roadway 100 from sidewalk 102, pedestrian P3 is initiating walking into roadway 100 from sidewalk 102, pedestrians P4, P5 are walking but distantly spaced from roadway 100, and pedestrian P6 is standing on sidewalk 104.

Figure 8:
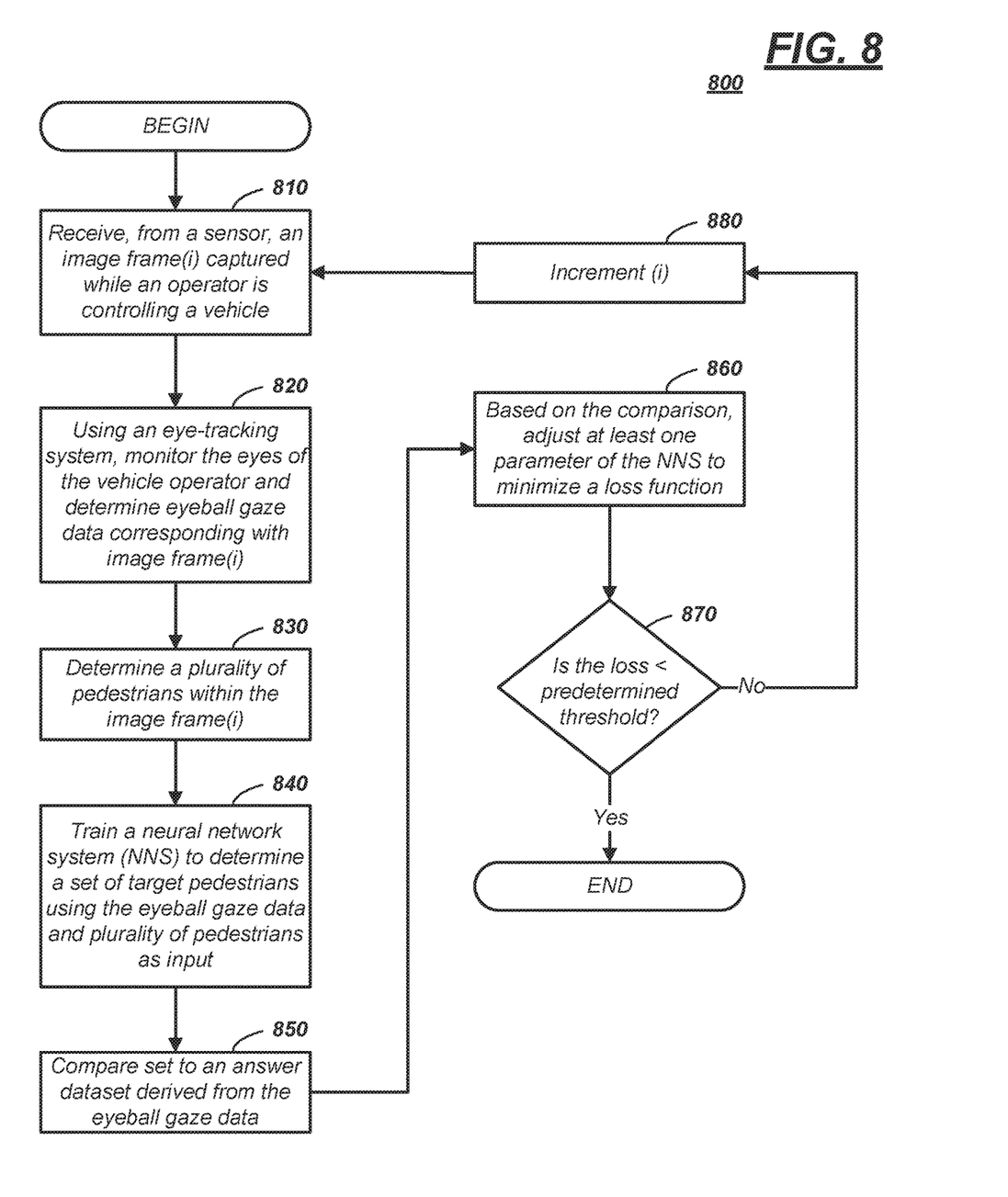
FIG. 8 is a flow diagram illustrating a process of training the neural network system (shown in FIG. 4) to determine one or more target pedestrians.

FIG. 8 is flow diagram(s) illustrating an example process 800 of training the neural network system (NNS) 48 shown in FIG. 4. The process 800 comprises software instructions executable by test computer 18 (e.g., executable by the one or more processors 40 stored in memory 42). Non-limiting examples of software instructions are illustrated as instructional blocks in the diagram. It will be appreciated that while not necessarily explained explicitly in process 800, other software instructions may be carried out as well.

Process 800 may begin at block 810, wherein test computer 18 receives (from sensor 22) at least one image frame(i) captured by sensor 22 while operator H is controlling vehicle 12. In at least one example, operator H is wearing the eye-tracking system 14, and the sensor 22 comprises part of the system 14 (e.g., carried by eyeglasses frames or the like). More particularly, according to one example, computer 28 (of eye-tracking system 14) first receives the frame(i) and—in addition to using the frame(i) in tracking the operator's eye movement—computer 28 provides the frame(i) to test computer 18. Not intending to be limiting but instead to illustrate process 800, consider the current image frame(i) of block 810 to be similar to that shown in FIG. 7. Thus, while the sensor is capturing image frames(i), operator H is controlling the vehicle 12 by steering, braking, and/or accelerating the vehicle 12 while driving down roadway 100.

In block 820 which follows, the eye-tracking system 14 monitors the eyes of operator H and determines eyeball gaze data that corresponds with image frame(i). As described above, determining eyeball gaze data may include the eye-tracking system 14 gathering multiple criteria by monitoring the operator's eyes using the camera(s) 24 and illuminator(s) 26 while the sensor 22 captures images of the scene forward-looking from the operator's perspective. Furthermore, the eyeball gaze data may include a correlation of the operator's eye criteria with the respective image frame(i). The eyeball gaze data may comprise at least some of the criteria cited in the non-exhaustive list of examples set forth above.

In block 830, test computer 18 may determine a plurality of pedestrians within the image frame(i)—e.g., block 830 may include determining each of pedestrians P1-P8. Block 830 may be executed by processor(s) 40 using the pedestrian detection algorithm 46 along first path (path1) via the first DNN 60. As described above, pedestrian detection algorithm 46 may provide bounding boxes around pedestrians P1-P8. (Block 830 also may comprise classifying pedestrians using the second DNN 70 (the CNN), as explained more below.)

In block 840, the test computer 18 may train the neural network system (NNS) 48 to determine a set_1(i) of target pedestrians for any given image frame; the training may comprise using the eyeball gaze data and the plurality of pedestrians P1-P8 determined by algorithm 46 as input to the first DNN 60. First DNN 60 may be a fully connected neural network, and it may be desirable that a fully connected neural network process the set_1(i) of target pedestrians identified by bounding boxes. The first DNN 60 may be trained to identify (using the eyeball gaze data) which of the pedestrians P1-P8 have a higher likelihood of collision with an object in their immediate environment (such as vehicle 12)—e.g., as a result of a position, speed, and/or trajectory of the vehicle 12 and/or a position, speed, and/or trajectory of the respective pedestrian.

Further, the training in block 840 may comprise training the second DNN 70 using the eyeball gaze data and the image frame(i) as input. Second DNN 60 may be convolutional neural network, and it may be desirable that a convolutional neural network process image frames(i) from sensor 22. Thus, as shown in FIG. 4, the second DNN 70 may be configured to both classify pedestrians P1-P8 (block 830), as well as be trained to identify (using the eyeball gaze data) a set_2(i) of target pedestrians, wherein similarly, these pedestrians have a higher likelihood of collision with an object in their immediate environment (such as vehicle 12)—e.g., as a result of a position, speed, and/or trajectory of the vehicle 12 and/or a position, speed, and/or trajectory of the respective pedestrian.

Thus, during the training phase of the neural network system 48, the respective outputs of both the first DNN 60 and the second DNN 70 (namely, set_1(i) and set_2(i)) may identify the same or different target pedestrians. As the neural network system 48 is trained better, it becomes more likely that these outputs will match one another in terms of the identified pedestrians. However, the format of the outputs may differ. For example, the output of first DNN 60 may be a scalar, whereas the output of the second DNN 70 may be a vector. As it may be desirable to provide an output of the neural network system 48 as a scalar, block 840 further may comprise providing the outputs of each of the first and second DNNs 60, 70 (set_1(i) and set_2(i)) as inputs to the third DNN 80 (e.g., which may be a fully connected neural network). This will yield the output (set_3 (i)) of third DNN 80 as a scalar. In some instances, the third DNN 80 further may use the eyeball gaze data as part of the training of block 840.

Continuing with the example image frame(i) shown in FIG. 7, when the neural network system 48 is trained, set_3(i) potentially could identify P1, P2, and P3 as the target pedestrians (e.g., provided the eyeball gaze data supports this). However typically, multiple iterations (loops of process 800) will be needed to fully train the neural network system 48.

In block 850 which follows, test computer 18 compares an answer dataset (derived from the eyeball gaze data) with the output of the neural network system 48 (e.g., with set_3(i)). The answer dataset may be defined (in part) by the operator H looking at a 3D gaze point for a threshold amount of time ($THR_{time1}$) (wherein the 3D gaze point corresponds with a pedestrian in the image frame(i)), a pupil size larger than a threshold ($THR_{pupil}$) while the operator H views a 3D gaze point for a second threshold amount of time ($THR_{time2}$), or the like). Block 850 further may comprise the test computer 18 developing the answer dataset based on the values of predetermined eyeball gaze data criteria.

In block 860 which follows, a programmer of the neural network system 48—according to a supervised learning technique—may adjust at least one parameter of the neural network system 48 to minimize a loss function, wherein the at least one parameter may be a weight of a neuron, wherein the loss function calculates a difference between the output set_3(i) and the answer dataset. Typically, multiple weights are adjusted. And any suitable loss function may be used.

In block 870 which follows, test computer 18 determines whether the calculated difference of the loss function is less than a threshold ($THR_{trained}$). When the difference is less than the threshold ($THR_{trained}$), then the process 800 may end as this implies adequate accuracy of the training system 10. And when the difference is not less than the threshold $THR_{trained}()$, then the process 800 may proceed to block 880 and ultimately loop back and begin again at block 810.

In block 880, the test computer 18 may increment a counter (e.g., i=i+1). Thus, in block 810 which may follow, test computer 18 begins to evaluate image frame(2). As discussed above, this process may loop repeatedly until the difference calculated in block 860 is less than the threshold ($THR_{trained}$).

Figure 9:
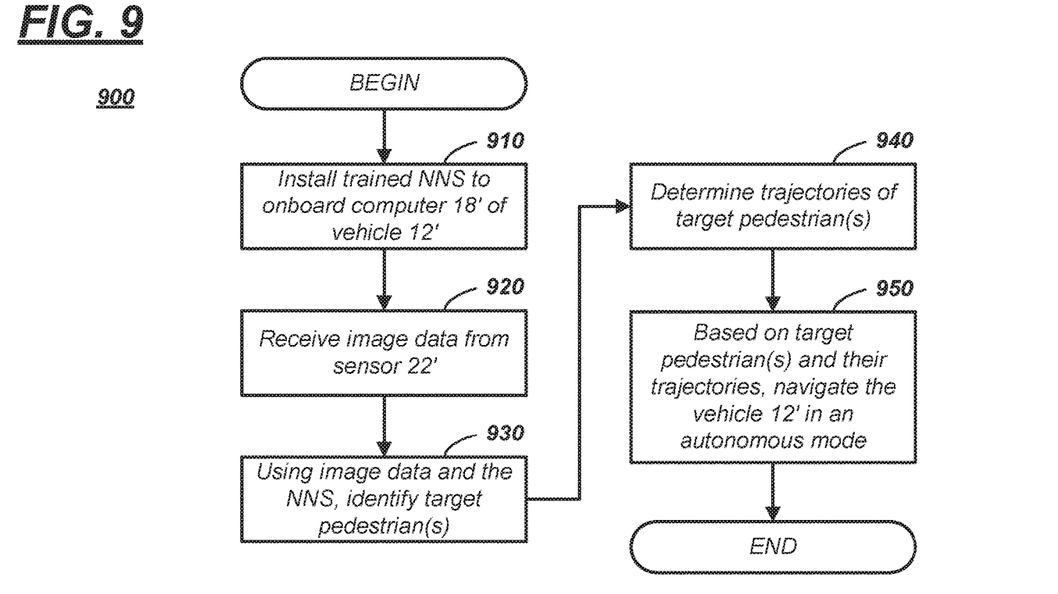
FIG. 9 is a flow diagram illustrating a process of using the trained neural network system.

FIG. 9 is flow diagram(s) illustrating a process 900 of using the neural network system (NNS) 48 trained in process 800. The process 900 comprises software instructions executable by an onboard vehicle computer 18' (e.g., executable by the one or more processors (not shown) stored in memory (not shown)). Non-limiting examples of software instructions are illustrated as instructional blocks in the diagram. It will be appreciated that while not necessarily explained explicitly in process 900, other software instructions may be carried out as well.

Other embodiments of the training system 10 are possible; accordingly, the process 800 may differ. For instance, according to one example, the convolutional neural network (second DNN 70) and the additional fully connected neural network (third DNN 80) may be omitted; e.g., neural network system 48 instead comprises the eye-tracking system 14, the pedestrian detection algorithm 46, and the first DNN 60. According to another embodiment, pedestrian detection algorithm 46 and the first DNN 60 may be omitted; e.g., neural network system 48 instead comprises the eye-tracking system 14 and the second and third DNNs 70, 80.

Figure 10:
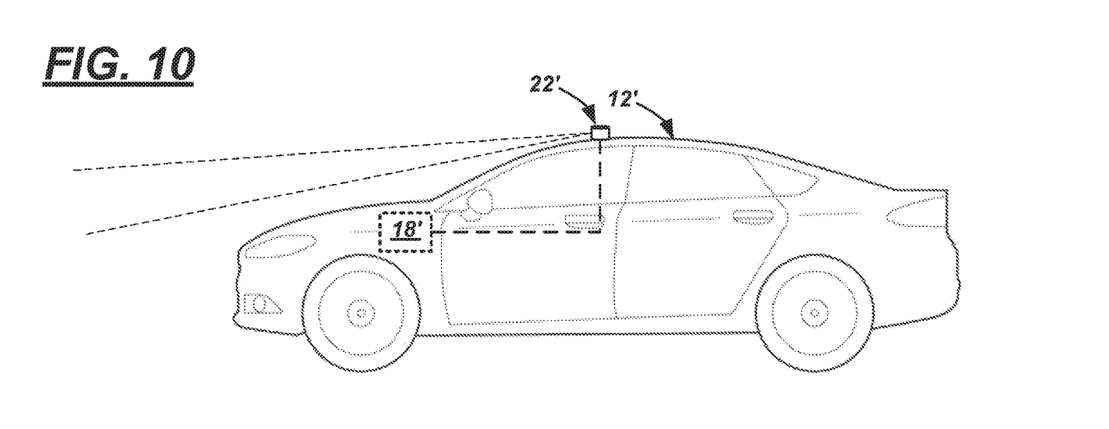
FIG. 10 is a schematic diagram illustrating a vehicle system configured to use the trained neural network system.

Process 900 may begin with block 910, wherein the trained neural network system (NNS) 48 is installed in the onboard computer 18' of vehicle 12' (shown in FIG. 10). Computer 18' may be embedded in vehicle 12', and vehicle 12' may be a sellable unit (e.g., sold by a vehicle manufacturer to an end user/customer).

In block 920, image data may be received at computer 18' via a sensor 22' mounted in vehicle 12'. Sensor 22' may be similar to sensor 22, except that it is not part of the eye-tracking system 14 (e.g., no eye-tracking system 14 is required in vehicle 12'). Instead, sensor 22' is used by vehicle 12' for navigation and/or other autonomous driving tasks.

In block 930 which follows, target pedestrians may be identified using the image data and the trained neural network system 48.

In block 940 which follows, computer 18' may calculate the trajectories of the target pedestrians. In at least one example, trajectories are calculated only for target pedestrians identified by the output of neural network system 48. As fewer trajectories may be calculated, the computational burden placed on computer 18' is minimized.

And in block 950, based on the target pedestrians and based on their trajectories, vehicle 12' is navigated in a partially or fully autonomous mode to avoid collisions.

Thus, there has been described a training system and a technique for using the training system to train a neural network system to determine target pedestrians while an operator is controlling a vehicle. The training system may comprise an eye-tracking system and one or more deep neural networks. Moreover, data from the eye-tracking system is used to execute the training.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A training system, comprising:
 a sensor;
 an eye-tracking system;
 a test computer communicatively coupled to the sensor and eye-tracking system, comprising one or more processors and memory storing instructions executable by the one or more processors, the instructions comprising to:
 receive, from the sensor, an image frame captured while an operator is controlling a vehicle;
 using the eye-tracking system, monitor the eyes of the operator to determine eyeball gaze data;
 determine, from the image frame, a plurality of pedestrians; and iteratively train a neural network system to determine, from among the plurality of pedestrians, the one or more target pedestrians that have a relatively-higher probability of collision with the vehicle than a remainder of the plurality of pedestrians, wherein iteratively training the neural network is performed using the eyeball gaze data;

wherein the neural network system comprises a pedestrian detection algorithm, a first deep neural network (first DNN), a second deep neural network (second DNN), and a third deep neural network (third DNN);

wherein an input to each of the pedestrian detection algorithm and the second DNN is the image frame;

wherein outputs of the first and second DNNs are inputs to the third DNN; and wherein an output of the third DNN is an indication of the one or more target pedestrians.

2. The system of claim 1, wherein the eye-tracking system is a wearable eye-tracking system and is worn by the operator while the image frame is captured by the sensor.

3. The system of claim 1, wherein the neural network system comprises a convolutional neural network (CNN) and a fully connected neural network, wherein an input to the CNN is the image frame, wherein an output of the CNN is provided to the fully connected neural network, wherein an output of the fully connected neural network is an indication of the one or more target pedestrians.

4. The system of claim 1, wherein iteratively training the neural network system further comprises providing eyeball gaze data to one or more of the first, second, and third DNNs.

5. The system of claim 1, wherein the first and third DNNs are each fully connected neural networks, wherein the second DNN is a convolutional neural network.

6. The system of claim 5, wherein the first DNN has a different quantity of hidden layers, a different quantity of neurons, or both than the second DNN.

7. The system of claim 1, wherein iteratively training the neural network system includes evaluating subsequent image frames with each of the pedestrian detection algorithm, the first DNN, the second DNN, and the third DNN.

8. The system of claim 1, wherein the pedestrian detection algorithm is a single shot multibox detector algorithm.

9. The system of claim 1, wherein iteratively training the neural network includes comparing an answer dataset with an output of the neural network, and the answer dataset is defined by applying a criterion to the eyeball gaze data directed at the pedestrians.

10. The system of claim 9, wherein the instructions further include instructions to calculate a difference using a loss function, wherein the difference is based on the answer dataset and the output of the neural networks system, wherein iteratively training the neural network system is repeated until the difference is less than a threshold.

11. The system of claim 10, wherein the instructions further include instructions to, when the difference is not less than the threshold, adjust a plurality of weights associated with neurons of the neural network system.

12. The system of claim 10, wherein the iteratively training comprises supervised learning.

13. The system of claim 1, wherein the image frame is one of a plurality of video frames received from the sensor.

14. The system of claim 1, wherein the eye-tracking system comprises one or more illuminators directed toward the operator's eyes and one or more cameras directed toward the operator's eyes, and the test computer is programmed to use the eyeball gaze data and the image frame to determine a gaze point of the operator, wherein the sensor comprises a red-green-blue (RGB) camera.

15. The method of claim 1, further comprising: installing the trained neural network system in a vehicle; and using the trained neural network system to navigate the vehicle in an autonomous mode.

16. The system of claim 1, wherein the eyeball gaze data comprises one or more of the following information: a timestamp (of the image frame), a left eye gaze point, a right eye gaze point, a left eye three-dimensional (3D) gaze position, a right eye 3D gaze position, a combined-eye 3D gaze position, a left eye pupil position, a right eye pupil position, a left eye pupil diameter, a right eye pupil diameter, a left eye confidence parameter, a right eye confidence parameter, a galvanic skin response parameter, a tri-axis accelerometer value, a tri-axis gyroscopic value, or a mapped gaze point.

17. A method of training a neural network system to determine one or more target pedestrians, comprising:

receiving, from a sensor, an image frame captured while an operator is controlling a vehicle;

using an eye-tracking system associated with the sensor, monitoring the eyes of the operator to determine eyeball gaze data;

determining, from the image frame, a plurality of pedestrians; and iteratively training the neural network system to determine, from among the plurality of pedestrians, the one or more target pedestrians that have a relatively-higher probability of collision with the vehicle than a remainder of the plurality of pedestrians, wherein iteratively training the neural network is performed using the eyeball gaze data;

wherein the neural network system comprises a pedestrian detection algorithm, a first deep neural network (first DNN), a second deep neural network (second DNN) and a third deep neural network (third DNN);

wherein an input to the pedestrian detection algorithm and the second DNN is the image frame;

wherein an output of the first DNN is an indication of the one or more target pedestrians;

wherein outputs of the first and second DNNs are inputs to the third DNN; and wherein an output of the third DNN is an indication of the one or more target pedestrians.

* * * * *